United States Patent
Takita et al.

(10) Patent No.: US 10,027,407 B2
(45) Date of Patent: Jul. 17, 2018

(54) DEVICE AND METHOD FOR DESIGNING OPTICAL NETWORK

(71) Applicant: FUJITSU LIMITED, Kawasaki-shi, Kanagawa (JP)

(72) Inventors: Yutaka Takita, Kawasaki (JP); Kazuyuki Tajima, Yokosuka (JP); Tomohiro Hashiguchi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/616,311

(22) Filed: Jun. 7, 2017

(65) Prior Publication Data

US 2018/0026716 A1    Jan. 25, 2018

(30) Foreign Application Priority Data

Jul. 19, 2016    (JP) .................................. 2016-141606

(51) Int. Cl.
*H04J 14/00* (2006.01)
*H04B 10/077* (2013.01)
(Continued)

(52) U.S. Cl.
CPC ....... *H04B 10/0779* (2013.01); *H04B 10/071* (2013.01); *H04B 10/272* (2013.01);
(Continued)

(58) Field of Classification Search
CPC ............... H04J 14/0227; H04J 14/0241; H04J 14/0257; H04J 14/0267
See application file for complete search history.

(56) References Cited

U.S. PATENT DOCUMENTS

2012/0321296 A1* 12/2012 Wellbrock ........... H04B 10/038
                                                                  398/5
2013/0195460 A1    8/2013 Kadohata et al.
(Continued)

FOREIGN PATENT DOCUMENTS

| JP | 2012-109928 | 6/2012 |
| JP | 2014-192642 | 10/2014 |
| JP | 2014-229938 | 12/2014 |

OTHER PUBLICATIONS

Y. Takita et al., "Wavelength Defragmentation with Minimum Optical Path Disruptions for Seamless Service Migration", OFC 2016, M2J.3 (3 pages).

*Primary Examiner* — Daniel Dobson
(74) *Attorney, Agent, or Firm* — Fujitsu Patent Center

(57) ABSTRACT

A network design device includes a processor. The processor determines a second wavelength allocation based on a first wavelength allocation that indicates a wavelength allocation for a plurality of optical lines established in a wavelength division multiplexing optical network. The processor searches for a disconnection target optical line that is requested to be disconnected in order to realize a transition from the first wavelength allocation to the second wavelength allocation from among the plurality of optical lines. The processor generates procedure information that indicates a procedure of the transition from the first wavelength allocation to the second wavelength allocation based on a difference between the first wavelength allocation and the second wavelength allocation and a searched disconnection target optical line.

11 Claims, 19 Drawing Sheets

(51) Int. Cl.
*H04J 14/02* (2006.01)
*H04B 10/50* (2013.01)
*H04B 10/572* (2013.01)
*H04Q 11/00* (2006.01)
*H04B 10/071* (2013.01)
*H04B 10/272* (2013.01)
*H04B 10/00* (2013.01)

(52) U.S. Cl.
CPC ......... *H04B 10/506* (2013.01); *H04B 10/572* (2013.01); *H04J 14/0201* (2013.01); *H04J 14/0212* (2013.01); *H04J 14/0241* (2013.01); *H04Q 11/0001* (2013.01)

(56) References Cited

U.S. PATENT DOCUMENTS

2014/0270804 A1* 9/2014 Hoshida ................ H04L 7/0075 398/154
2014/0294384 A1 10/2014 Wakabayashi
2014/0344433 A1 11/2014 Takita et al.

* cited by examiner

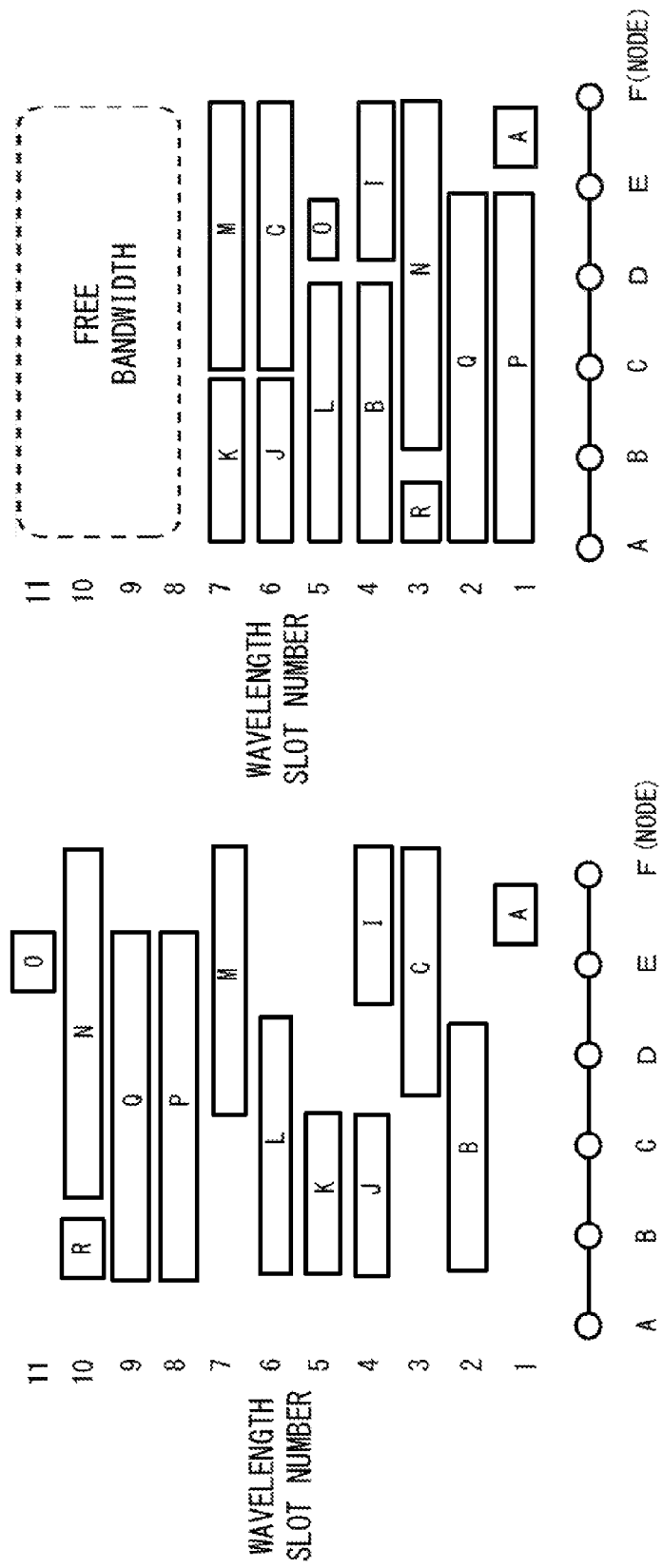

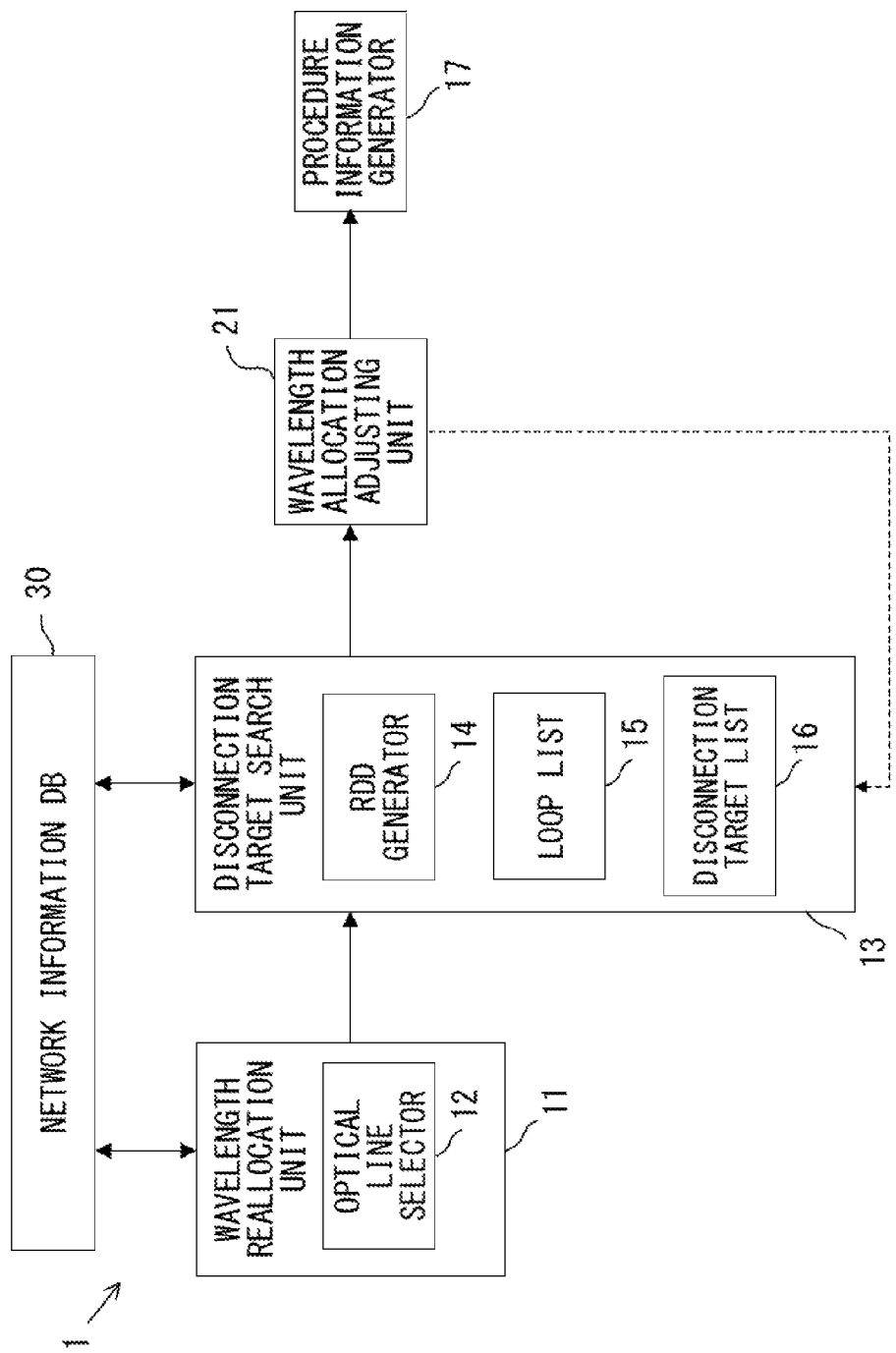
F I G. 11

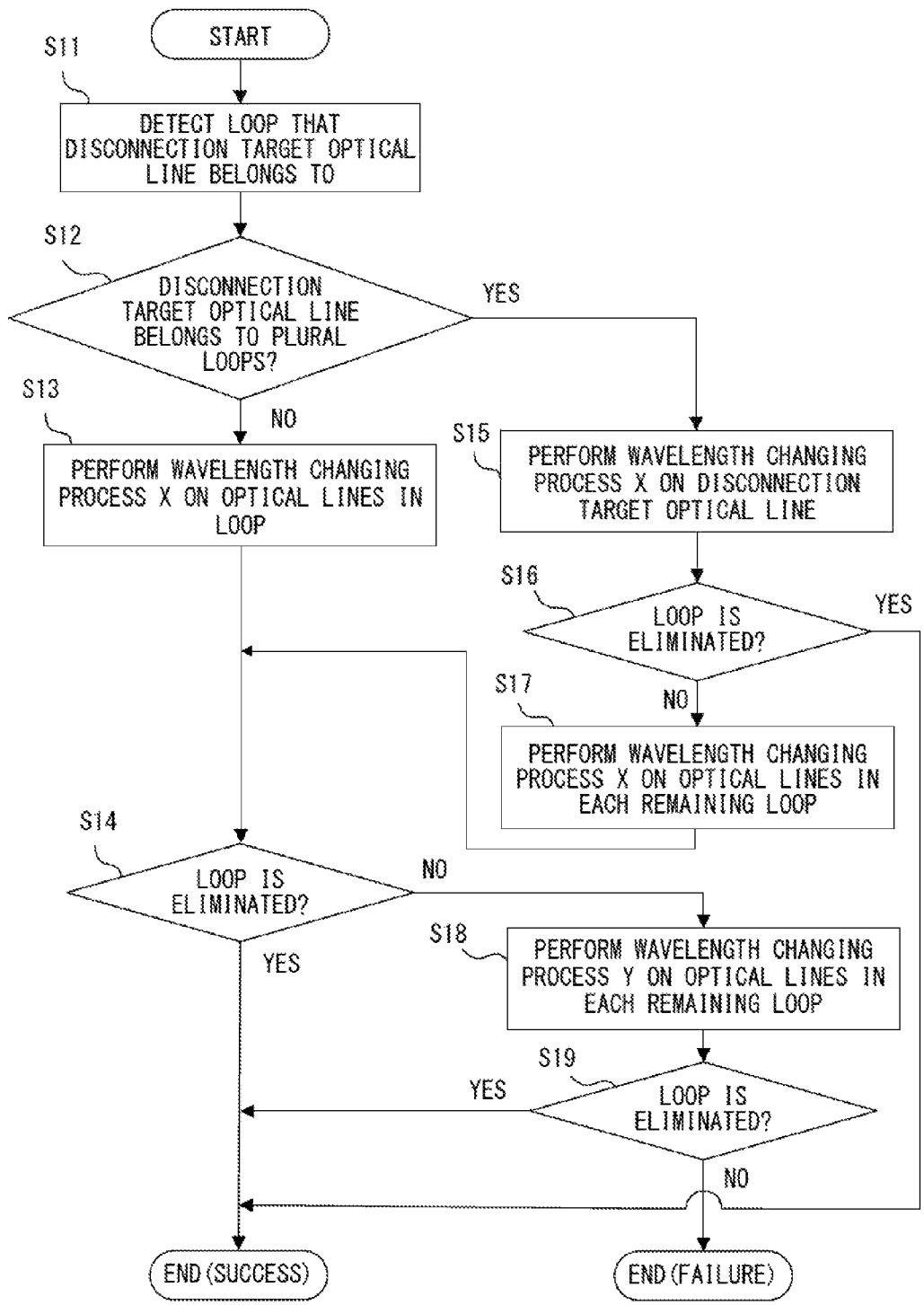
F I G. 1 2

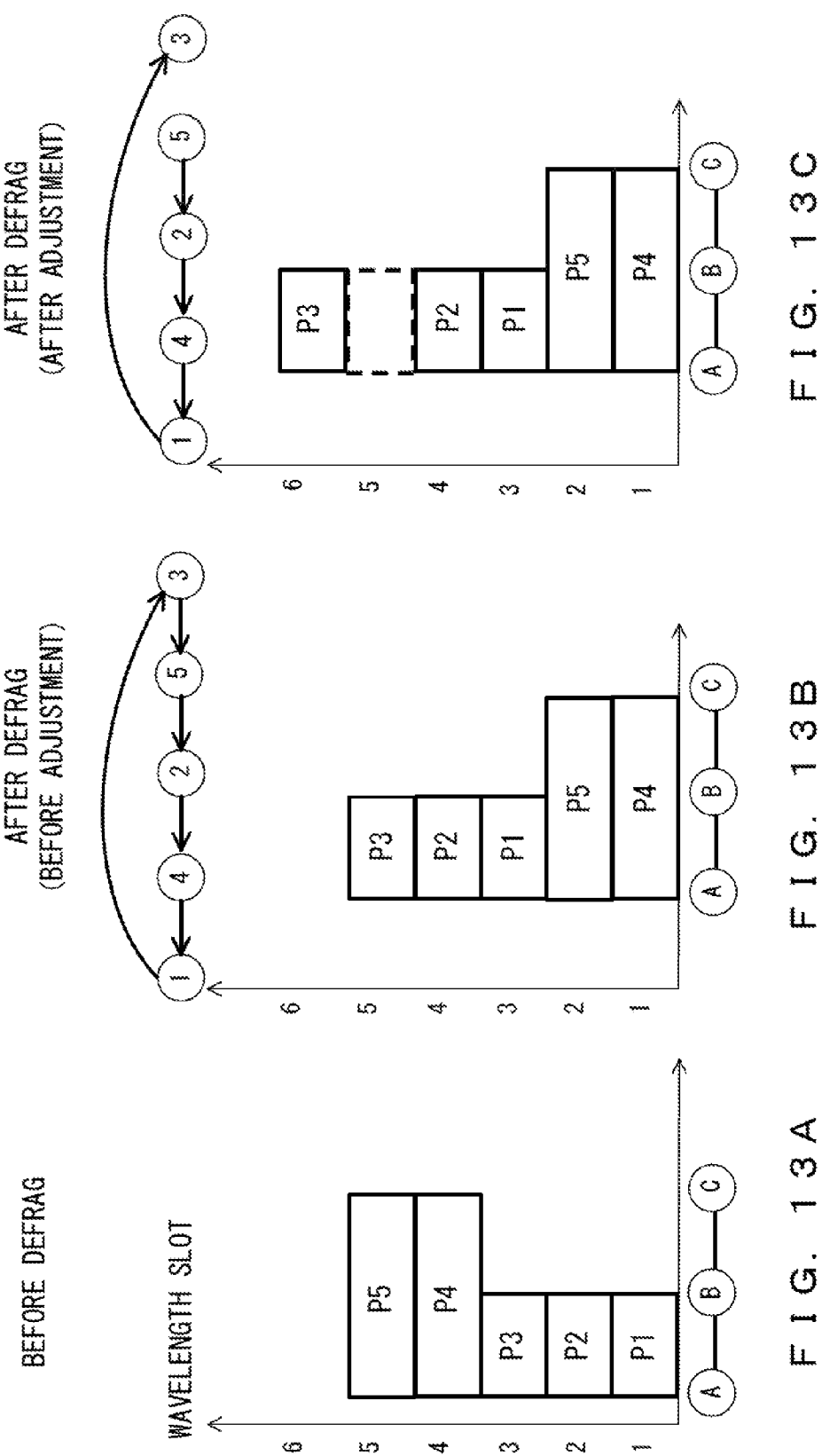

FIG. 15A BEFORE DEFRAG

FIG. 15B FIRST EMBODIMENT

FIG. 15C SECOND EMBODIMENT

FIG. 15D OPTIMUM DEFRAG

FIG. 18

| | INTEGER LINEAR PROGRAMMING | FIRST EMBODIMENT | SECOND EMBODIMENT |
|---|---|---|---|
| RESOURCE USAGE EFFICIENCY | ◎ | ◎ | ○ |
| IMPACT ON OPTICAL LINE | ◎ | △ | ◎ |
| SCALABILITY | × | ○ | ○ |

DEVICE AND METHOD FOR DESIGNING OPTICAL NETWORK

CROSS-REFERENCE TO RELATED APPLICATION

This application is based upon and claims the benefit of priority of the prior Japanese Patent Application No. 2016-141606, filed on Jul. 19, 2016, the entire contents of which are incorporated herein by reference.

FIELD

The embodiments discussed herein are related to a device and a method for designing a wavelength division multiplexing optical network.

BACKGROUND

When optical lines are accommodated by using wavelength division multiplexing (WDM), a network management system allocates wavelengths to the respective optical lines. A process for allocating wavelengths to optical lines to be allocated may be referred to as wavelength allocation design. Note that an "optical line" in the description below corresponds to an optical path (or a wavelength path) that is established between two nodes.

In the wavelength allocation design, wavelengths are allocated to respective optical lines that are established on each optical fiber in such a way that the wavelengths of the respective optical lines are different from each other. In addition, in order to reduce the cost of a network, the same wavelength is used on a route from a start point node to an end point node of each of the optical lines in many cases.

In recent years, an operation scheme in which an optical line of a needed bandwidth is established as needed has been widely used according to, for example, software defined networking (SDN). Namely, an optical line may be frequently added or deleted. Therefore, even in a case in which wavelengths are allocated to respective optical lines in such a way that wavelength usage efficiency is high at a particular point in time, when an optical line is added or deleted afterward, the wavelength usage efficiency may decrease. Accordingly, an operation is requested in which the wavelength usage efficiency is monitored and wavelength allocation is changed when the wavelength usage efficiency decreases. An action to change wavelength allocation during operation may be referred to as wavelength reallocation or defragmentation (or simply referred to as "defrag").

In the example illustrated in FIG. 1A, in a WDM optical network including nodes A-F, thirteen optical lines are established by using wavelength slots 1-11. However, wavelength usage efficiency is not high in this wavelength allocation. As an example, wavelength slot 1 is used by a link between node E and node F, but is not used by respective links between node A and node E. In addition, wavelength slot 2 is used by respective links between node A and node D, but is not used by respective links between node D and node F. Note that a wavelength slot corresponds to a minimum unit of wavelength resources allocated to an optical line.

FIG. 1B illustrates an example of a result of performing wavelength reallocation on the WDM optical network illustrated in FIG. 1A. In this example, wavelength slots 8-11 are not allocated to any optical lines. Namely, wavelength slots 8-11 can be allocated to new optical lines in arbitrary links.

As described above, wavelength reallocation enables the wavelength usage efficiency of a WDM optical network to be improved.

As a related technology, a wavelength path reallocation method for designing wavelength paths in such a way that a used frequency area becomes smaller than before reallocation has been proposed (for example, US Patent Publication No. 2013/0195460). A method for reoptimizing a network while reducing the number of cancellations of demands allocated to slots has been proposed (for example, Japanese Laid-open Patent Publication No. 2014-229938). Further, a method for performing wavelength reallocation while suppressing an influence on optical lines has been proposed (for example, Y. Takita et al., Wavelength Defragmentation with Minimum Optical Path Disruptions for Seamless Service Migration, OFC2016, M2J.3).

As described above, wavelength reallocation enables the usage efficiency of wavelength resources of a WDM optical network to be improved. However, it is not easy to determine an optimum procedure for changing wavelength slots according to the wavelength reallocation. As an example, it is not easy to determine a procedure for changing wavelength slots allocated to respective optical lines without disconnecting any optical lines.

According to the above paper, Y. Takita et al., a procedure for changing wavelength slots allocated to respective optical lines while minimizing the disconnection of optical lines can be determined. However, when the number of nodes in an optical network is large and its topology is complicated, it takes a long time to determine an optimum wavelength allocation and a procedure for changing wavelength slots. Therefore, in a conventional technology, it is difficult to dynamically change wavelength allocation of a large-scale WDM optical network.

SUMMARY

According to an aspect of the present invention, a network design device includes a processor configured to determine a second wavelength allocation (i.e., allocation after wavelength defrag) based on a first wavelength allocation (i.e., allocation before wavelength defrag) that indicates a wavelength allocation for a plurality of optical lines established in a wavelength division multiplexing optical network; to search for a disconnection target optical line that is requested to be disconnected in order to realize a transition from the first wavelength allocation to the second wavelength allocation from among the plurality of optical lines; and to generate procedure information that indicates a procedure of the transition from the first wavelength allocation to the second wavelength allocation based on a difference between the first wavelength allocation and the second wavelength allocation and a searched disconnection target optical line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B illustrate an example of improvement in wavelength usage efficiency due to wavelength defrag.

FIG. 11 illustrates an example of a network design device according to a second embodiment.

FIG. 12 is a flowchart illustrating an example of processing performed by a wavelength allocation adjusting unit.

FIGS. 13A-13C illustrate an example of a change in wavelengths performed by a wavelength allocation adjusting unit.

FIGS. 15A-15D illustrate an example of a simulation result of wavelength defrag.

FIG. 18 illustrates effects according to the first embodiment and the second embodiment.

DESCRIPTION OF EMBODIMENTS

Figure 2:
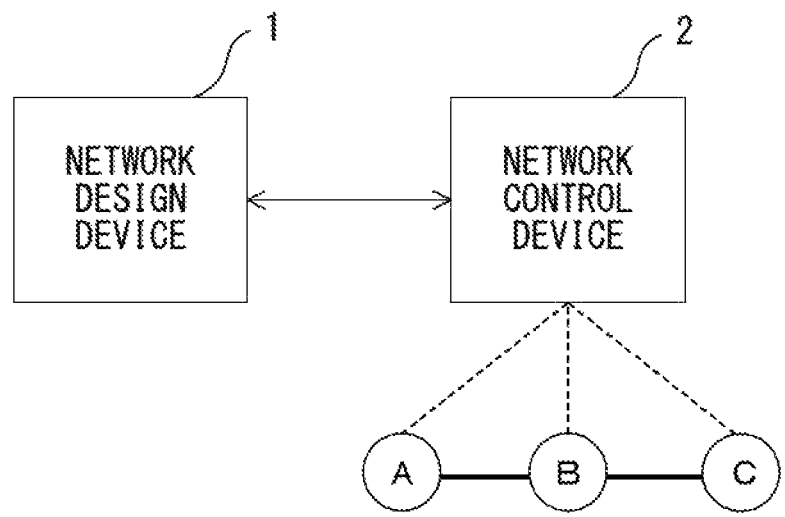
FIG. 2 illustrates an example of an optical network system in which a network design device is used.

FIG. 2 illustrates an example of an optical network system in which a network design device according to the embodiments is used. In the example illustrated in FIG. 2, node A and node B, and node B and node C are connected by respective optical fiber links.

The optical network system transmits a wavelength division multiplexed optical signal (hereinafter referred to as a WDM optical signal) between nodes. Accordingly, a node device provided in each of the nodes is implemented, for example, by a reconfigurable optical add-drop multiplexer (ROADM).

Upon receipt of a line demand to establish, delete, or change an optical line, a network design device 1 determines wavelength allocation according to the line demand. The wavelength allocation includes information representing allocation of wavelengths to respective optical lines. A network control device 2 is connected to the respective nodes. The network control device 2 issues an instruction to establish, delete, or change an optical line to the respective node devices in accordance with the wavelength allocation determined by the network design device 1. Consequently, an optical network according to the line demand is configured.

The network design device 1 monitors the wavelength usage efficiency of an optical network periodically or according to an instruction from a network administrator. When the wavelength usage efficiency of the optical network is lower than a specified reference level, the network design device performs wavelength reallocation. The wavelength reallocation includes a process for changing wavelengths that have been allocated to one or more optical lines established on the optical network. The network design device 1 gives allocation information representing a new wavelength allocation to the network control device 2. Then, the network control device 2 reconfigures the optical network according to the allocation information. Consequently, the wavelength usage efficiency of the optical network is improved.

Figure 3A:
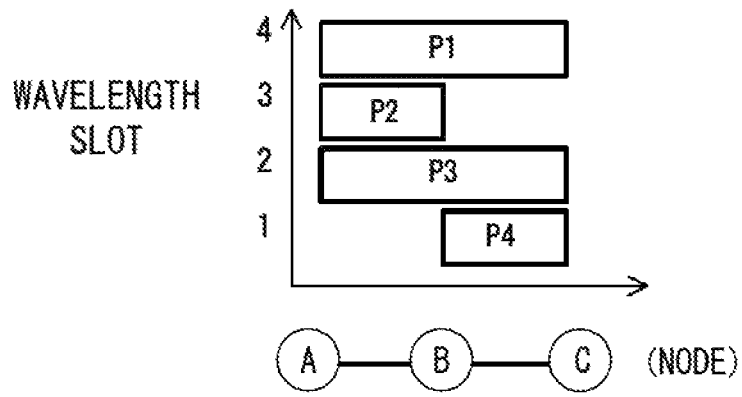
FIGS. 3A-3C illustrate examples of wavelength defrag and their resource dependency digraphs.
Figure 3B:
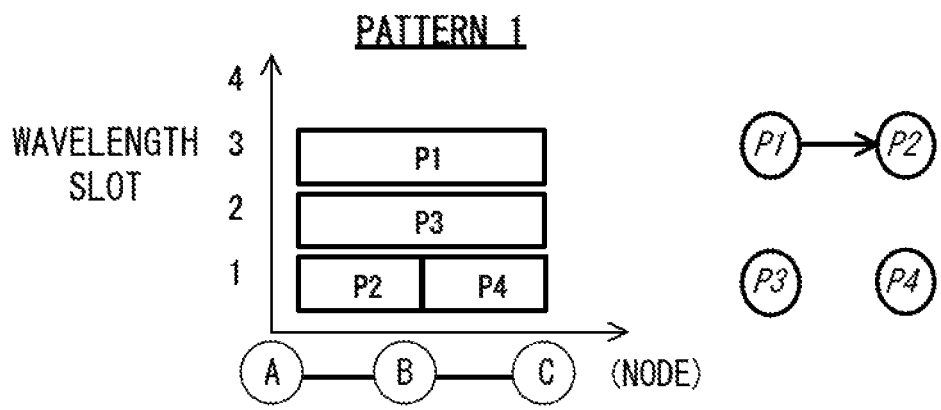
Figure 3C:
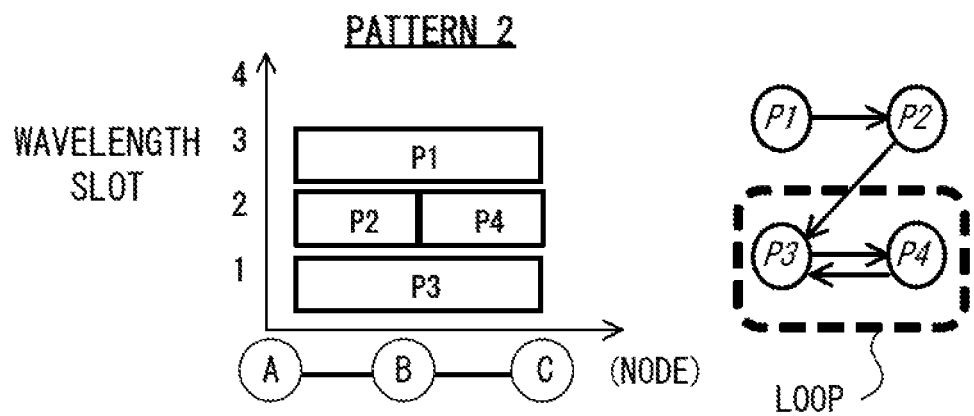

FIGS. 3A-3C illustrate examples of wavelength defrag and their resource dependency digraphs. In these examples, optical lines P1-P4 are established on an optical network including nodes A-C, as illustrated in FIG. 3A. Each of optical lines P1 and P3 is established on a route from node A via node B to node C. Optical line P2 is established between node A and node B. Optical line P4 is established between node B and node C. Further, wavelength slots 4, 3, 2, and 1 are respectively allocated to optical lines P1, P2, P3, and P4. Namely, four wavelength slots are used to establish optical lines P1-P4. Note that each of the wavelength slots corresponds to a minimum unit of wavelength resources allocated to an optical line.

In the wavelength allocation illustrated in FIG. 3A, wavelength slot 1 is not used between node A and node B. In addition, wavelength slot 3 is not used between node B and node C. Namely, in the wavelength allocation illustrated in FIG. 3A, the wavelength usage efficiency of the optical network is not high. In this case, the network design device 1 performs wavelength defrag.

FIGS. 3B and 3C illustrate examples of a new wavelength allocation obtained due to wavelength defrag. In both cases, optical lines P1-P4 are established by using wavelength slots 1-3, and wavelength slot 4 is released. Here, the released wavelength slot 4 can be allocated to another optical line. Namely, the wavelength usage efficiency of the optical network is improved due to wavelength defrag.

As described above, the effect of improving the wavelength usage efficiency is the same in allocation pattern 1 illustrated in FIG. 3B and allocation pattern 2 illustrated in FIG. 3C. However, a procedure for changing wavelength allocation to respective optical lines in wavelength defrag is different between allocation pattern 1 and allocation pattern 2.

Figure 4:
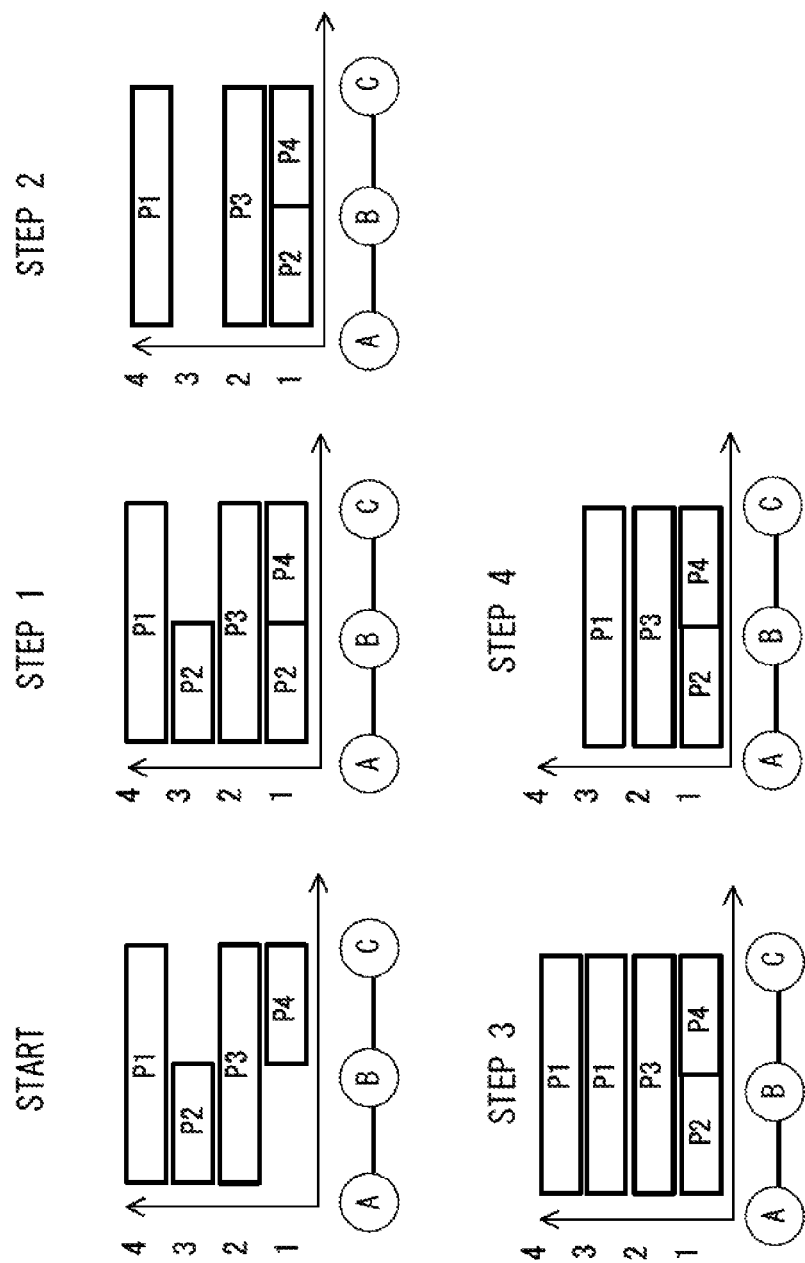
FIG. 4 illustrates an example of a procedure of a transition to the wavelength allocation illustrated in FIG. 3B.

FIG. 4 illustrates an example of a procedure of a transition from a current wavelength allocation illustrated in FIG. 3A to allocation pattern 1 illustrated in FIG. 3B. In this example, assume that wavelength allocation to respective optical lines is changed by using the make-before-brake scheme. In this case, step 1 to step 4 described below are performed.

Step 1: The new optical line P2 is established by using wavelength slot 1.

Step 2: The old optical line P2 is deleted (consequently, wavelength slot 3 is released).

Step 3: The new optical line P1 is established by using wavelength slot 3.

Step 4: The old optical line P1 is deleted (consequently, wavelength slot 4 is released).

As described above, when wavelength defrag is performed by using the make-before-brake scheme, no optical lines are disconnected. As an example, when a wavelength slot of optical line P2 is changed, new optical line P2 is established before optical line P2 is deleted. Then, respective node devices are controlled such that data of optical line P2 is transmitted via new optical line P2. Thereafter, old optical line P2 is deleted. Therefore, data transmission of optical line P2 is not interrupted.

However, in order to allocate wavelength slot 3 to optical line P1 in a transition from the wavelength allocation illustrated in FIG. 3A to allocation pattern 1 illustrated in FIG. 3B, wavelength slot 3 needs to have already been released. Stated another way, a change in wavelength allocation for optical line P2 needs to be finished before wavelength allocation for optical line P1 is changed.

As described above, when wavelength allocation for a plurality of optical lines is changed in wavelength defrag, a dependency may exist among the plurality of optical lines. This dependency is expressed, for example, by a resource dependency digraph (RDD). In the resource dependency digraph, when a wavelength slot that has been allocated to optical line x before wavelength defrag is allocated to optical line y after the wavelength defrag, this dependency is expressed by "x←y" by using a directed graph. "x←y" represents a state in which optical line y depends on optical line x and "a change in wavelength allocation to optical line y fails to be performed unless a change in wavelength allocation to optical line x is completed".

In the case of a transition from the current wavelength allocation to allocation pattern 1, the resource dependency digraph illustrated in FIG. 3B is generated. This resource dependency digraph includes a directed graph from optical line P1 to optical line P2. This directed graph represents a state in which optical line P1 depends on optical line P2. Note that optical lines P3 and P4 are not connected by a directed graph.

In the case of a transition from the current wavelength allocation to allocation pattern 2, the resource dependency digraph illustrated in FIG. 3C is generated. Namely, the following dependencies exist in this wavelength defrag.
(1) Before a wavelength slot of optical line P1 is changed, a wavelength slot of optical line P2 needs to be changed, and wavelength slot 3 needs to be released.
(2) Before a wavelength slot of optical line P2 is changed, a wavelength slot of optical line P3 needs to be changed, and wavelength slot 2 needs to be released.
(3) Before a wavelength slot of optical line P3 is changed, a wavelength slot of optical line P4 needs to be changed, and wavelength slot 1 needs to be released.
(4) Before a wavelength slot of optical line P4 is changed, a wavelength slot of optical line P3 needs to be changed, and wavelength slot 2 needs to be released.

Here, optical line P3 and optical line P4 are dependent on each other. In this case, a change in wavelength allocation fails to be performed unless one of optical line P3 and optical line P4 is temporarily disconnected. In the description below, this state may be referred to as a "loop".

Figure 5:
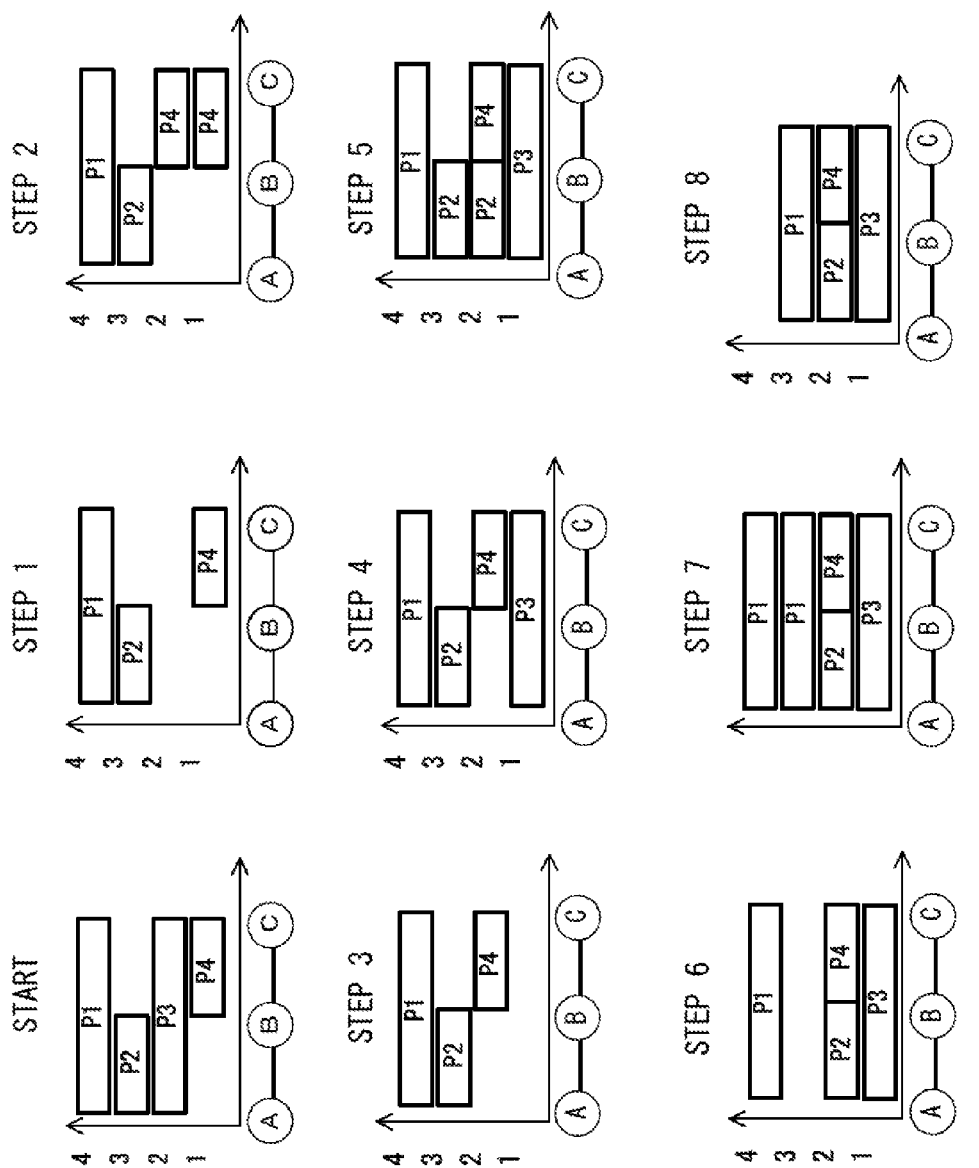
FIG. 5 illustrates an example of a procedure of a transition to the wavelength allocation illustrated in FIG. 3C.

FIG. 5 illustrates an example of a procedure of a transition from the current wavelength allocation to the wavelength allocation illustrated in FIG. 3C. In this case, step 1 to step 8 described below are performed, for example.
Step 1: Optical line P3 is disconnected.
Step 2: The new optical line P4 is established by using wavelength slot 2.
Step 3: The old optical line P4 is deleted (consequently, wavelength slot 1 is released).
Step 4: Optical line P3 is reestablished by using wavelength slot 1.
Step 5: The new optical line P2 is established by using wavelength slot 2.
Step 6: The old optical line P2 is deleted (consequently, wavelength slot 3 is released).
Step 7: The new optical line P1 is established by using wavelength slot 3.
Step 8: The old optical line P1 is deleted (consequently, wavelength slot 4 is released).

As described above, in wavelength defrag in which a resource dependency digraph includes a loop, at least one optical line needs to be temporarily disconnected. Accordingly, it is preferable that the network control device 2 perform wavelength defrag in allocation pattern 1, not in allocation pattern 2.

However, in a large-scale optical network in which the number of nodes is large, it takes a long calculation time to determine an optimum wavelength allocation that enables wavelength usage efficiency to be improved without disconnecting any optical lines. Accordingly, the network design device 1 according to the embodiments has a function of determining an almost optimum wavelength allocation in a short calculation time.

Figure 6:
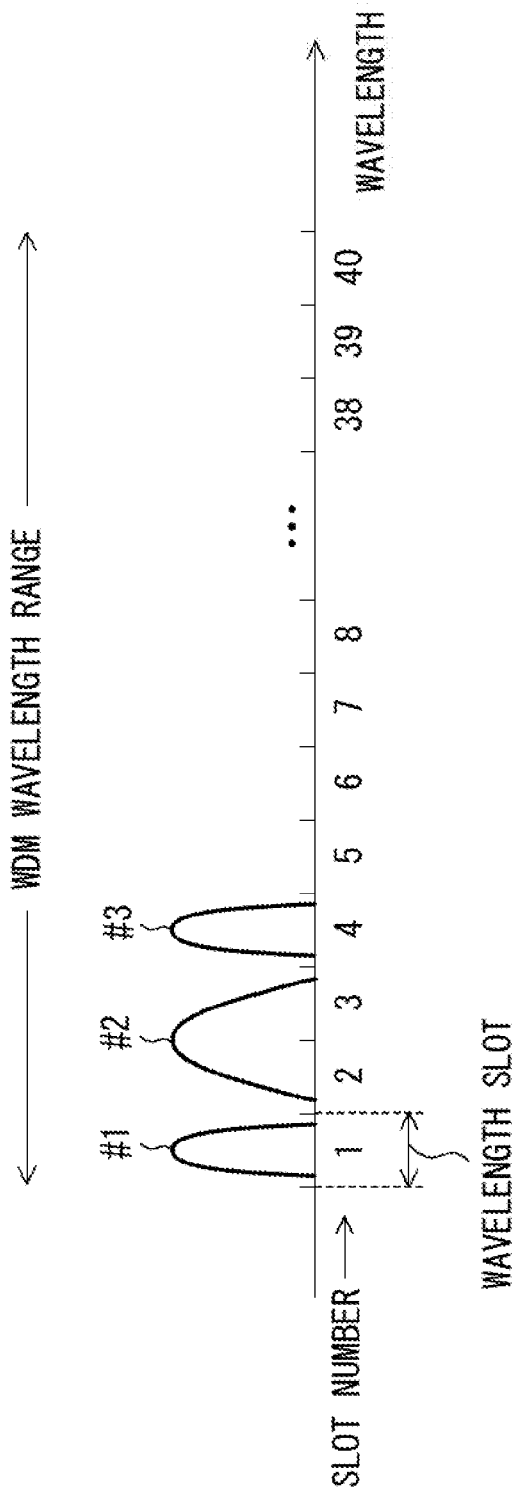
FIG. 6 illustrates examples of wavelength slots used in a WDM optical network.

FIG. 6 illustrates examples of wavelength slots used in a WDM optical network. A wavelength slot corresponds to a minimum unit of wavelength resources allocated to an optical line. Accordingly, a WDM wavelength range is divided into a plurality of wavelength slots. In the example illustrated in FIG. 6, a WDM wavelength range is divided into 40 wavelength slots. In addition, the bandwidths of the respective wavelength slots are the same as each other in this example. The bandwidth of each of the wavelength slots is defined, for example, by an optical frequency. As an example, the bandwidth of each of the wavelength slots is 12.5 GHz.

When an optical line is established in the WDM optical network, one or more wavelength slots are allocated to the optical line. The number of wavelength slots allocated to the optical line depends on a symbol rate and a modulation scheme of an optical signal transmitted via the optical line. In the example illustrated in FIG. 6, one wavelength slot (wavelength slot 1) is allocated to optical line #1, two wavelength slots (wavelength slots 2 and 3) are allocated to optical line #2, and one wavelength slot (wavelength slot 4) is allocated to optical line #3.

In this example, the priority of each of the wavelength slots is specified in advance. The priority represents the order of allocation to an optical line. In the example illustrated in FIG. 6, a wavelength slot having a small slot number has a high priority, and a wavelength slot having a large slot number has a low priority. Namely, in a case in which a plurality of wavelength slots can be allocated to a requested optical line, a wavelength slot having the smallest slot number among the plurality of wavelength slots is allocated to the requested optical line. Accordingly, in an initial state, wavelength slot 1 is allocated to the requested optical line. In addition, when a new optical line is established in the state illustrated in FIG. 6, wavelength slot 5 is allocated to the new optical line. In the description below, the wavelength slot may be simply referred to as a "slot".

First Embodiment

Figure 7:
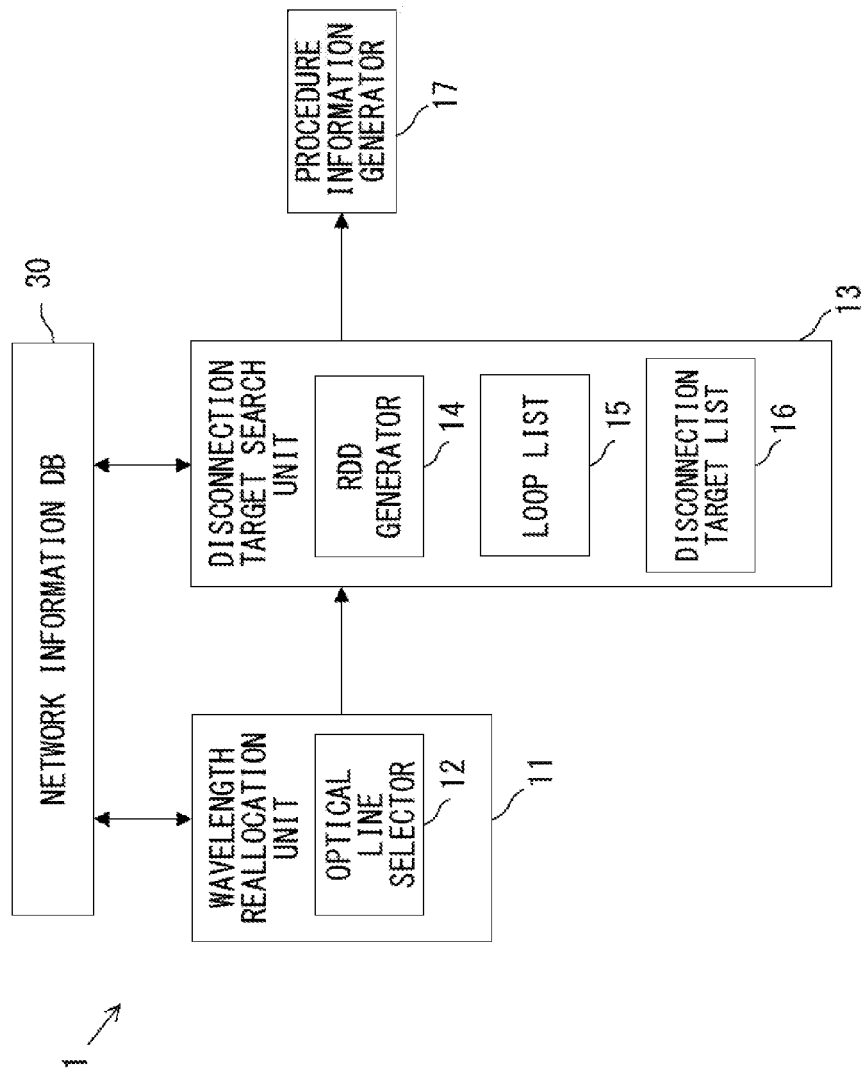
FIG. 7 illustrates an example of a network design device according to a first embodiment.

FIG. 7 illustrates an example of a network design device according to a first embodiment. In the first embodiment, the network design device 1 includes a wavelength reallocation unit 11, a disconnection target search unit 13, and a procedure information generator 17. A network information database 30 may be incorporated in the network design device 1, or may be connected to the network design device 1.

The network information database 30 stores topology information that represents the topology of an optical network. The topology information includes node information that identifies a node in the optical network, and link information that identifies a link (or a span) between adjacent nodes. In addition, the network information database 30 stores optical line information that represents respective optical lines established on the optical network. The optical line information includes wavelength allocation information that represents wavelength allocation to the respective optical lines. Namely, information that represents a current wavelength allocation of the optical network is stored in the network information database 30.

Upon receipt of a reallocation instruction to perform wavelength defrag, the wavelength reallocation unit 11 determines a new wavelength allocation for which wavelength usage efficiency is higher than that of the current wavelength allocation. The wavelength allocation information representing the current wavelength allocation is stored in the network information database 30, as described above. The reallocation instruction is given, for example, from a network administrator. Alternatively, the reallocation instruction is automatically generated by a network management system that manages the optical network.

A method for determining a new wavelength allocation from the current wavelength allocation is not particularly limited. As an example, according to an algorithm for preferentially allocating an idle slot having a shorter wavelength to an optical line, the wavelength reallocation unit 11 determines for each optical line whether a slot having a wavelength shorter than that of a currently allocated slot is idle. In the example illustrated in FIG. 3A, a wavelength slot of optical line P2 can be changed from "slot 3" to "slot 1".

Further, after the wavelength slot of optical line P2 is changed, a wavelength slot of optical line P1 can be changed from "slot 4" to "slot 3". Consequently, the wavelength allocation illustrated in FIG. 3B is obtained. Alternatively, the wavelength reallocation unit 11 may preferentially allocate a slot having a shorter wavelength to an optical line for which the number of fiber spans is larger. In addition, the wavelength reallocation unit 11 may perform wavelength reallocation by using an algorithm for preferentially allocating an idle slot having a longer wavelength to an optical line.

However, in a large-scale optical network in which the number of nodes is large and the number of wavelength slots is large, the time needed to determine a new wavelength allocation from a current wavelength allocation may increase. Accordingly, the wavelength reallocation unit 11 restricts an optical line to which wavelength allocation can be changed, by using an optical line selector 12.

The optical line selector 12 selects an optical line to which wavelength allocation can be changed from among optical lines established on the optical network. At this time, the optical line selector 12 may select an optical line, for example, according to a usage situation of wavelength slots.

Figure 8:
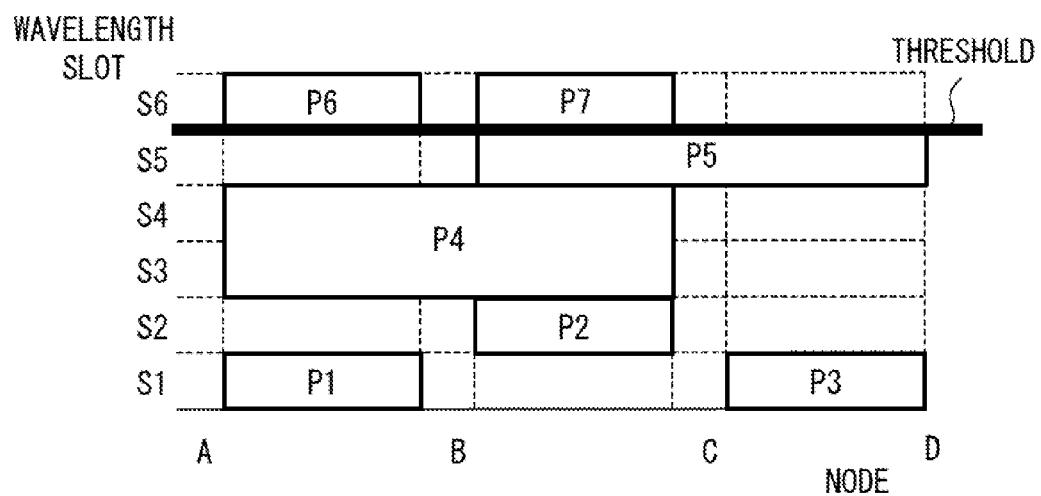
FIG. 8 illustrates an example of a method for selecting an optical line according to a usage situation of wavelength slots.

FIG. 8 illustrates an example of a method for selecting an optical line according to a usage situation of wavelength slots. Optical lines P1-P7 are established on an optical network including nodes A-D. Specifically, optical line P1 is established between node A and node B, optical line P2 is established between node B and node C, optical line P3 is established between node C and node D, optical line P4 is established between node A and node C, optical line P5 is established between node B and node D, optical line P6 is established between node A and node B, and optical line P7 is established between node B and node C. One wavelength slot is allocated to each of optical lines P1, P2, P3, P5, P6, and P7 in each span. Two wavelength slots are allocated to optical line P4 in each of the spans.

The optical line selector 12 calculates an individual used bandwidth representing the sum of the bandwidths of optical lines that are allocated to respective optical lines. In the example illustrated in FIG. 8, in a span between node A and node B, slot 1 is allocated to optical line P1, slots 3 and 4 are allocated to optical line P4, and slot 6 is allocated to optical line P6. Namely, four wavelength slots are used in the span between node A and node B. Similarly, five wavelength slots are used in a span between node B and node C. Two wavelength slots are used in a span between node C and node D.

The optical line selector 12 calculates a maximum bandwidth representing a maximum value of individual used bandwidths calculated for the respective spans. In the example illustrated in FIG. 8, "number of slots: 5" is obtained as the maximum bandwidth. The optical line selector 12 selects an optical line that belongs to a wavelength region that exceeds the maximum bandwidth, by using a slot having the shortest wavelength as a reference. In the example illustrated in FIG. 8, slot 1 is a reference slot. Accordingly, an optical line to which a slot having a wavelength longer than that of slot 5 is selected. Specifically, the optical line selector 12 selects optical lines P6 and P7 to which slot 6 has been allocated. According to an algorithm for preferentially allocating an idle slot having a longer wavelength to an optical line, the optical line selector 12 selects an optical line that belongs to a wavelength region that exceeds the maximum bandwidth, by using a slot having the longest wavelength as a reference.

The wavelength reallocation unit 11 can change wavelength allocation to the optical line selected by the optical line selector 12, when determining a new wavelength allocation. In other words, the wavelength reallocation unit 11 does not change wavelength allocation to an optical line that is not selected by the optical line selector 12, when determining a new wavelength allocation. In the example illustrated in FIG. 8, a change in wavelength allocation is allowed only for optical lines P6 and P7. In this case, as an example, the wavelength reallocation unit 11 changes a wavelength slot allocated to optical line P6 from slot 6 to slot 2, and changes a wavelength slot allocated to optical line P7 from slot 6 to slot 1. Consequently, a new wavelength allocation is determined.

The optical line selector 12 may select an optical line according to another policy. As an example, the optical line selector 12 may select an optical line for which the number of fiber spans is smaller than a specified value.

As described above, upon receipt of the reallocation instruction to perform wavelength defrag, the wavelength reallocation unit 11 determines a new wavelength allocation for which wavelength usage efficiency is higher than that of a current wavelength allocation. Then, wavelength allocation information representing the new wavelength allocation is given to the disconnection target search unit 13.

The disconnection target search unit 13 searches for a disconnection target optical line that is requested to be disconnected in order to realize a transition from the current wavelength allocation to the new wavelength allocation from among a plurality of optical lines established on the optical network. Wavelength allocation information representing the current wavelength allocation is stored in the network information database 30, as described above. In addition, wavelength allocation information representing the new wavelength allocation is generated by the wavelength reallocation unit 11.

The disconnection target search unit 13 generates a resource dependency digraph (RDD) representing wavelength defrag from the current wavelength allocation to the new wavelength allocation, by using an RDD generator 14. The resource dependency digraph is generated by specifying a wavelength slot that is allocated in a wavelength allocation after wavelength defrag for each of the optical lines, and by detecting an optical line to which the specified wavelength slot is allocated in wavelength allocation before wavelength defrag. In the example illustrated in FIGS. 3A and 3B, wavelength slot 3 is allocated to optical line P1 in the wavelength allocation after wavelength defrag. Wavelength slot 3 is allocated to optical line P2 in the wavelength allocation before wavelength defrag. In this case, it is determined that optical line P1 depends on optical line P2. A method for generating the resource dependency digraph is not particularly limited, and may be generated by using a known technology.

Figure 9:
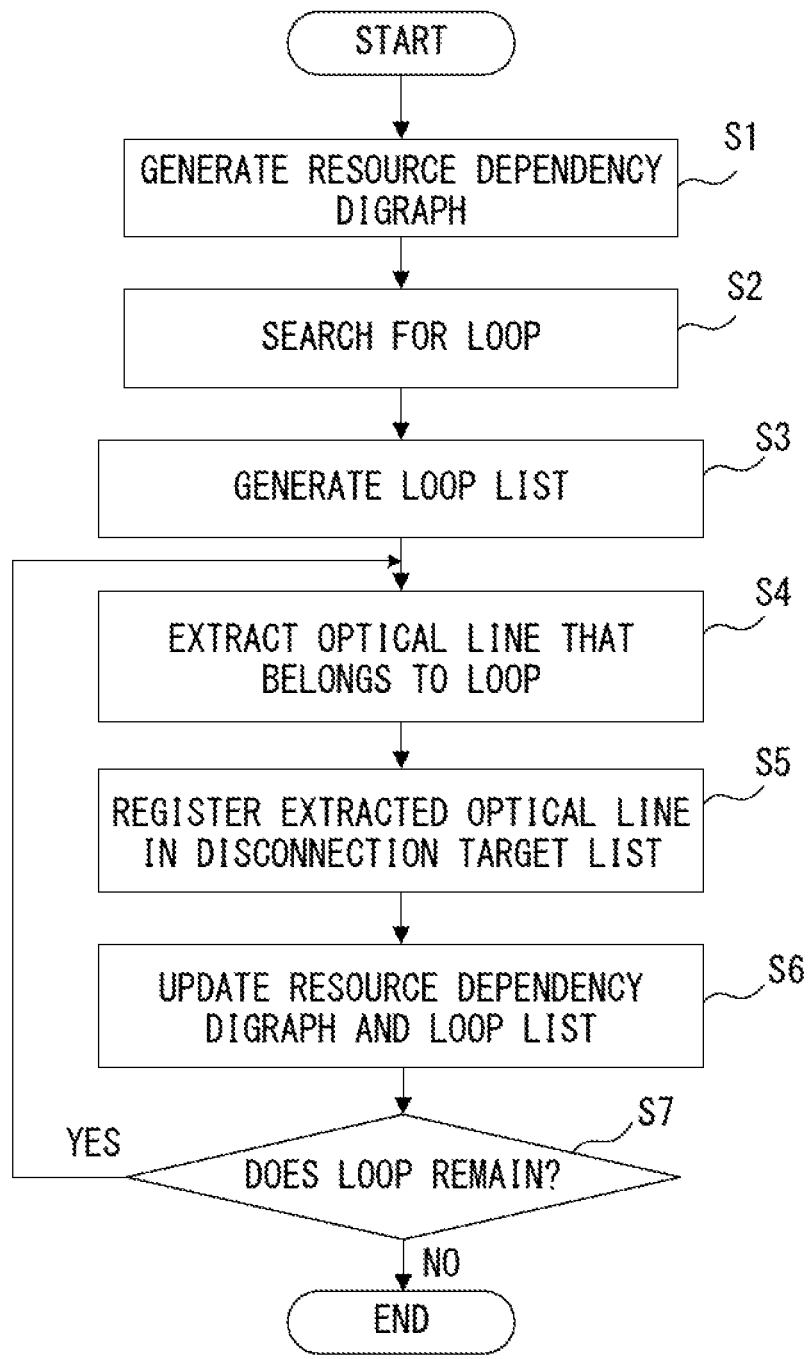
FIG. 9 is a flowchart illustrating an example of processing performed by a disconnection target search unit.

FIG. 9 is a flowchart illustrating an example of processing performed by the disconnection target search unit 13. The processing of this flowchart is performed when wavelength allocation information representing a new wavelength allocation is given from the wavelength reallocation unit 11 to the disconnection target search unit 13.

In S1, the RDD generator 14 generates a resource dependency digraph representing wavelength defrag from a current wavelength allocation to a new wavelength allocation. In S2 and S3, the disconnection target search unit 13 searches for a loop in the resource dependency digraph. The disconnection target search unit 13 registers a detected loop in a loop list 15. When no loops exist in the resource dependency digraph, the processing of the disconnection target search unit 13 is terminated.

In S4, the disconnection target search unit 13 extracts one optical line included in the detected loop. At this time, the disconnection target search unit 13 may extract an optical line for which the number of loops that the optical line belongs to is the largest. In this case, it is preferable that optical lines be sorted in descending order of the number of loops that each of the optical lines belongs to. In S5, the disconnection target search unit 13 registers the extracted optical line in a disconnection target list 16.

In S6, the disconnection target search unit 13 generates a resource dependency digraph according to wavelength allocation at the time when the optical line extracted in S4 is disconnected. Stated another way, the resource dependency digraph is updated according to the wavelength allocation at the time when the optical line extracted in S4 is disconnected. Further, the disconnection target search unit 13 searches for a loop in the updated resource dependency digraph. The disconnection target search unit 13 updates the loop list 15 according to this search result.

In S7, the disconnection target search unit 13 determines whether a loop remains in the updated loop list 15.

When a loop remains in the updated loop list 15, the processing of the disconnection target search unit 13 returns to S4. Namely, the disconnection target search unit 13 repeatedly performs the processes of S4-S6 until no loops exist in the resource dependency digraph. When no loops exist in the resource dependency digraph, the processing of the disconnection target search unit 13 is terminated.

Figure 10A:
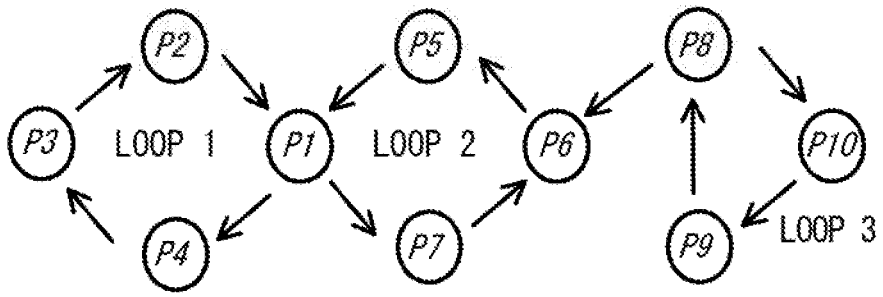
FIGS. 10A-10C illustrate an example of processing performed by a disconnection target search unit utilizing resource dependency digraph.
Figure 10B:
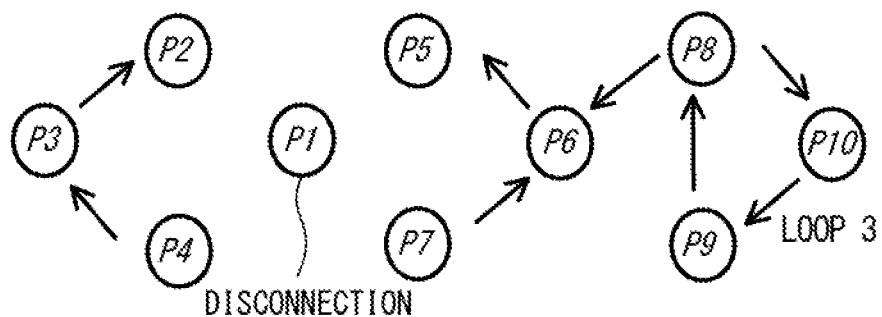
Figure 10C:
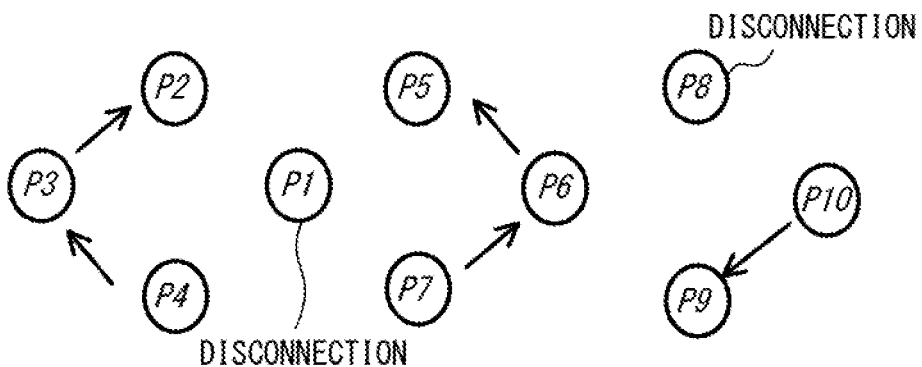

FIGS. 10A-10C illustrate an example of processing performed by the disconnection target search unit 13 utilizing resource dependency digraph. In this example, it is assumed that the resource dependency digraph illustrated in FIG. 10A is generated according to a current wavelength allocation and a new wavelength allocation in S1 of the flowchart.

In this case, in S2 and S3, the following three loops are detected, and are registered in the updated loop list 15.
Loop 1: P1, P2, P3, P4
Loop 2: P1, P5, P6, P7
Loop 3: P8, P9, P10

In S4 and S5, the disconnection target search unit 13 extracts one optical line that belongs to the detected loops. Here, optical line P1 belongs to two loops (loops 1 and 2). In contrast, each of optical lines P2-P10 belongs to one loop. In this case, the disconnection target search unit 13 extracts optical line P1 from among optical lines P1-P10. The disconnection target search unit 13 registers the extracted optical line P1 as a disconnection target optical line in the disconnection target list 16.

In S6, the disconnection target search unit 13 generates a new resource dependency digraph according to wavelength allocation at the time when optical line P1 is disconnected. In this case, a dependency between optical lines P1 and P2, a dependency between optical lines P1 and P4, a dependency between optical lines P1 and P5, and a dependency between optical lines P1 and P7 disappear, respectively. Consequently, the resource dependency digraph illustrated in FIG. 10B is generated. In this resource dependency digraph, loop 1 and loop 2 have disappeared. Accordingly, the loop list 15 is updated to the following state.
Loop 3: P8, P9, P10

In S7, the disconnection target search unit 13 determines whether a loop remains in the updated loop list 15. In this example, loop 3 remains in the loop list 15, and therefore the processing of the disconnection target search unit 13 returns to S4. Namely, the processes of S4-S6 are performed on the resource dependency digraph illustrated in FIG. 10B.

In S4 and S5, the disconnection target search unit 13 extracts one optical line that belongs to loop 3. At this time, all of optical lines P8, P9, and P10 that belong to loop 3 belong to one loop. Accordingly, the disconnection target search unit 13 extracts arbitrary one of optical lines P8, P9, and P10. Here, it is assumed that optical line P8 is extracted. The disconnection target search unit 13 registers the extracted optical line P8 as a disconnection target optical line in the disconnection target list 16.

In S6, the disconnection target search unit 13 generates a new resource dependency digraph according to wavelength allocation at the time when optical line P8 is disconnected. In this case, a dependency between optical lines P8 and P6, a dependency between optical lines P8 and P9, and a dependency between optical lines P8 and P10 disappear, respectively. Consequently, the resource dependency digraph illustrated in FIG. 10C is generated.

In S7, the disconnection target search unit 13 determines whether a loop remains in the updated loop list 15.

In this example, no loops remain in the loop list 15. Accordingly, the processing of the disconnection target search unit 13 is terminated. When the processing above is terminated, optical line P1 and optical line P8 have been registered as disconnection target optical lines in the disconnection target list 16.

The procedure information generator 17 generates procedure information representing a procedure of a transition from a current wavelength allocation to a new wavelength allocation in accordance with a difference between the current wavelength allocation and the new wavelength allocation and a search result of the disconnection target search unit 13. Stated another way, the procedure information generator 17 generates procedure information representing a procedure of wavelength defrag in accordance with allocation information representing the current wavelength allocation, allocation information representing the new wavelength allocation, the updated resource dependency digraph, and the disconnection target list 16.

The allocation information representing the current wavelength allocation is stored in the network information database 30. The allocation information representing the new wavelength allocation is generated by the wavelength reallocation unit 11. The resource dependency digraph is generated by the RDD generator 14, and is updated by the disconnection target search unit 13. The disconnection target list 16 is generated by the disconnection target search unit 13. Here, in a case in which a loop exists in an initial state of the resource dependency digraph, one or more optical lines have been registered in the disconnection target list 16. When the one or more optical lines have been registered in the disconnection target list 16, the procedure information includes an instruction to disconnect the one or more optical lines registered in the disconnection target list 16.

As an example, when wavelength defrag from the wavelength allocation illustrated in FIG. 3A to the wavelength allocation illustrated in FIG. 3B is performed, procedure information representing an instruction to perform step 1 to step 4 described above with reference to FIG. 4 is generated. When wavelength defrag from the wavelength allocation illustrated in FIG. 3A to the wavelength allocation illustrated in FIG. 3C is performed, procedure information representing an instruction to perform step 1 to step 8 described above with reference to FIG. 5 is generated.

Procedure information generated by the network design device 1 is reported to the network control device 2. Then, the network control device 2 performs wavelength defrag according to the procedure information.

As described above, in the network design method according to the first embodiment, a process for determining a procedure for changing wavelength allocation is separated from a process for determining a new wavelength allocation. Accordingly, even in a large-scale optical network, the time needed to determine a procedure of wavelength defrag is short. In addition, an optical line to which wavelength allocation can be changed in wavelength reallocation is restricted, and therefore the time needed to determine wavelength allocation is reduced.

Second Embodiment

In the first embodiment, when a loop exists in the resource dependency digraph, one or more optical lines are temporarily disconnected in wavelength defrag. In contrast, in the second embodiment, when a loop exists in the resource dependency digraph, a new wavelength allocation representing a wavelength allocation after wavelength defrag is adjusted such that wavelength defrag can be performed without disconnecting any optical lines. Then, wavelength defrag from a current wavelength allocation to the newly adjusted wavelength allocation is performed.

FIG. 11 illustrates an example of a network design device according to the second embodiment. In the second embodiment, the network design device 1 includes a wavelength allocation adjusting unit 21 in addition to the wavelength reallocation unit 11, the disconnection target search unit 13, and the procedure information generator 17. The wavelength reallocation unit 11, the disconnection target search unit 13, and the procedure information generator 17 are substantially the same in the first embodiment and the second embodiment. However, the disconnection target search unit 13 may include a function of updating the resource dependency digraph, the loop list 15, and the disconnection target list 16 according to the adjustment of wavelength allocation that is performed by the wavelength allocation adjusting unit 21, in addition to functions in the first embodiment.

When a disconnection target optical line is registered in the disconnection target list 16, the wavelength allocation adjusting unit 21 adjusts a new wavelength allocation generated by the wavelength reallocation unit 11. At this time, the wavelength allocation adjusting unit 21 adjusts the new wavelength allocation in such a way that an optical line is prevented from being disconnected in wavelength defrag. Specifically, the wavelength allocation adjusting unit 21 changes a wavelength slot to be allocated to the disconnection target optical line registered in the disconnection target list 16.

FIG. 12 is a flowchart illustrating an example of processing performed by the wavelength allocation adjusting unit 21. The processing of this flowchart is performed when a disconnection target optical line is specified by the disconnection target search unit 13. The disconnection target optical line has been registered in the disconnection target list 16. In the example illustrated in FIGS. 10A-10C, optical line P1 and optical line P8 have been registered as disconnection target optical lines in the disconnection target list 16. The processing of this flowchart is performed on a loop that the disconnection target optical line belongs to.

In S11 an S12, the wavelength allocation adjusting unit 21 detects a loop that the disconnection target optical line belongs to. The wavelength allocation adjusting unit 21 determines whether the disconnection target optical line belongs to only one loop or a plurality of loops. In the example illustrated in FIGS. 10A-10C, optical line P1 belongs to two loops, and optical line P8 belongs to one loop.

When the disconnection target optical line belongs to only one loop, the wavelength allocation adjusting unit 21 performs a wavelength changing process X on optical lines in the loop in S13. The wavelength allocation adjusting unit 21 first searches for a change candidate optical line to which wavelength allocation will be changed from among the optical lines that belong to the loop with the following priorities First priority: A wavelength allocated in a wavelength allocation after wavelength defrag is the longest.

Second priority: The number of spans is smaller than a specified number.

Third priority: A bandwidth is narrower than a specified threshold.

Then, the wavelength allocation adjusting unit 21 searches for a wavelength slot that satisfies the following two conditions for the change candidate optical line.

Condition 1: A loop is eliminated.

Condition 2: A slot having a wavelength shorter than a target longest wavelength Note that the threshold illustrated in FIG. 8 may be used as the target longest wavelength. However, in a case where wavelength allocation is performer with an algorithm for preferentially allocating an idle slot having a longer wavelength to an optical line, a slot having a wavelength longer than a target shortest wavelength is searched.

FIGS. 13A-13C illustrate an example of a change in wavelengths performed by the wavelength allocation adjusting unit 21. FIG. 13A illustrates a current wavelength allocation, and FIG. 13B illustrates a wavelength allocation after wavelength defrag. The wavelength allocation after wavelength defrag is determined by the wavelength reallocation unit 11. A resource dependency digraph of this wavelength defrag includes a loop, as illustrated in FIG.

13B. Namely, at least one optical line needs to be disconnected in order to realize the wavelength defrag from the wavelength allocation illustrated in FIG. 13A to the wavelength allocation illustrated in FIG. 13B.

The wavelength allocation adjusting unit 21 first extracts a change candidate optical line from among optical lines P1-P5 that belong to this loop with the priorities described above. Namely, the wavelength allocation adjusting unit 21 first specifies an optical line that corresponds to the first priority. In the example illustrated in FIG. 13B, a slot having the longest wavelength in the wavelength allocation after wavelength defrag is wavelength slot 5. Wavelength slot 5 has been allocated to optical line #3. Accordingly, the wavelength allocation adjusting unit 21 performs the wavelength changing process X on optical line #3. Here, it is assumed that optical line #3 satisfies conditions 1 and 2 described above. In this case, the wavelength allocation adjusting unit 21 changes a wavelength slot to be allocated to optical line #3 after wavelength defrag. In this example, a wavelength slot to be allocated to optical line #3 is changed from slot 5 to slot 6 in the wavelength allocation after wavelength defrag, as illustrated in FIG. 13C. Consequently, a dependency between optical line #3 and optical line #5 disappears, and a loop is eliminated. Accordingly, wavelength defrag from the wavelength allocation illustrated in FIG. 13A to the wavelength allocation illustrated in FIG. 13C can be performed without disconnecting any optical lines.

When the optical line selected with the first priority does not satisfy conditions 1 and 2 described above, the wavelength allocation adjusting unit 21 may perform the wavelength changing process X on an optical line selected with the second priority or the third priority.

In S14, the wavelength allocation adjusting unit 21 determines whether a loop in the resource dependency digraph has been eliminated. When a loop has been eliminated, the processing of the wavelength allocation adjusting unit 21 is terminated. When a loop has not been eliminated, the processing of the wavelength allocation adjusting unit 21 moves on to S18.

When the disconnection target optical line belongs to a plurality of loops (S12: Yes), the wavelength allocation adjusting unit 21 performs the wavelength changing process X on the disconnection target optical line in S15. Namely, when the disconnection target optical line satisfies conditions 1 and 2 described above, the wavelength allocation adjusting unit 21 changes a wavelength slot to be allocated to the optical line in the wavelength allocation after wavelength defrag.

In S16, the wavelength allocation adjusting unit 21 determines whether a loop in the resource dependency digraph has been eliminated. When a loop has been eliminated, the processing of the wavelength allocation adjusting unit 21 is terminated. When a loop has not been eliminated, the processing of the wavelength allocation adjusting unit 21 moves on to S17.

In S17, the wavelength allocation adjusting unit 21 performs the wavelength changing process X on optical lines that belong to each of the remaining loops. As a result of this, when a loop further remains, the processing of the wavelength allocation adjusting unit 21 moves on to S18 through S14.

In S18, the wavelength allocation adjusting unit 21 performs a wavelength changing process Y on optical lines that belong to each of the remaining loops. In the wavelength changing process Y, a wavelength slot that satisfies condition 1 described below for the change candidate optical line extracted according to the priorities above is searched for.
Condition 1: A loop is eliminated.

As described above, a wavelength slot is searched for according to only condition 1 without using condition 2 described above in S18. Namely, a target slot can be obtained more easily in the wavelength changing process Y than in the wavelength changing process X. Consequently, when a loop is eliminated, the processing of the wavelength allocation adjusting unit 21 is terminated. When the process of S18 is performed but a loop is not eliminated, it is determined that a change in wavelengths has failed. In this case, an optical line needs to be disconnected in wavelength defrag.

Figure 14A:
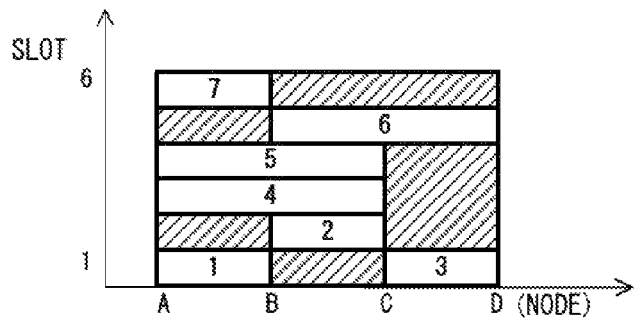
FIGS. 14A-14D illustrate an example of adjustment processing performed by a wavelength allocation adjusting unit.

FIGS. 14A-14D illustrate an example of adjustment processing performed by the wavelength allocation adjusting unit 21. FIG. 14A illustrates a current wavelength allocation. Specifically, optical lines P1-P7 have been established on an optical network including nodes A-D. Six wavelength slots are used to establish optical lines P1-P7. Note that a hatched region represents an unused wavelength slot.

Figure 14B:
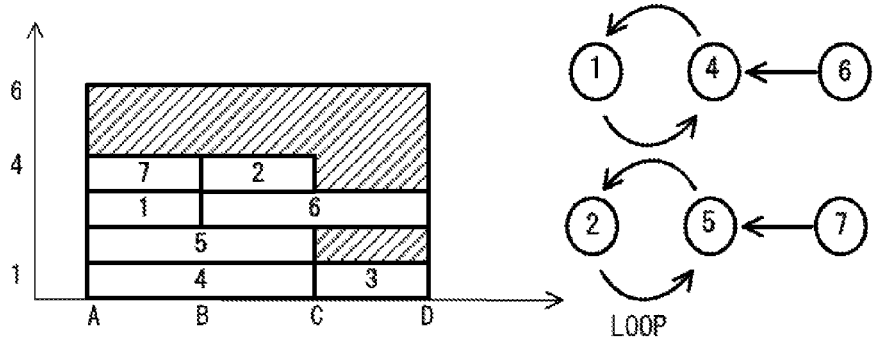
Figure 14C:
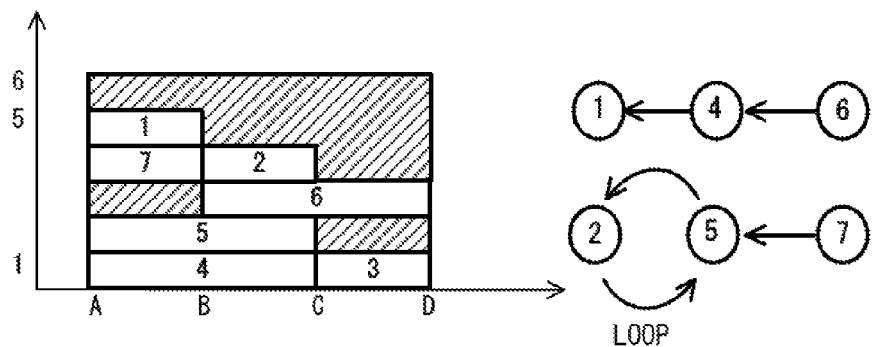

FIG. 14B illustrates a new wavelength allocation determined by the wavelength reallocation unit 11 (namely, a wavelength allocation after wavelength defrag). In the new wavelength allocation, wavelength slots 5 and 6 have been released by allocating wavelengths as short as possible to optical lines P1-P7. However, two loops are generated, as illustrated by a resource dependency digraph. Stated another way, in a case in which wavelength defrag from the current wavelength allocation to the wavelength allocation illustrated in FIG. 14B is performed, one of optical line P1 and optical line P4 needs to be disconnected, and one of optical line P2 and optical line P5 needs to be disconnected.

Accordingly, the wavelength allocation adjusting unit 21 changes wavelengths of optical lines in the loops in accordance with the flowchart illustrated in FIG. 12. In a case in which a loop that optical lines P1 and p4 belong to is eliminated, the wavelength allocation adjusting unit 21 performs the wavelength changing process of S13. Here, in the wavelength allocation illustrated in FIG. 14B, the wavelengths of slots allocated to optical lines P1 and P4 are shorter than the wavelength of a slot allocated to optical line P7. That is, the wavelengths of slots allocated to optical lines P1 and P4 are not the longest. Therefore, optical lines P1 and P4 are not selected with the first priority. However, the number of spans of optical line P1 is "1". Here, it is assumed that the specified number of spans is two in the second priority. In this case, optical line P1 is selected with the second priority.

Then, the wavelength allocation adjusting unit 21 changes a wavelength slot to be allocated to optical line P1 in the wavelength allocation after wavelength defrag from slot 3 to slot 5. By doing this, the loop that optical lines P1 and P4 belong to is eliminated.

Also in a case in which a loop that optical lines P2 and P5 belong to is eliminated, the wavelength allocation adjusting unit 21 performs the wavelength changing process of S13. Here, in the wavelength allocation illustrated in FIG. 14C, the wavelength of a slot allocated to optical line P2 is longer than the wavelength of a slot allocated to any other optical line in the span between node B and node C. Accordingly, optical line P2 is selected with the first priority. In this case, the wavelength allocation adjusting unit 21 changes a wavelength slot to be allocated to optical line P2 in the wavelength allocation after wavelength defrag from slot 4 to slot 5. By doing this, the loop that optical lines P2 and p5 belong to is eliminated.

Figure 14D:
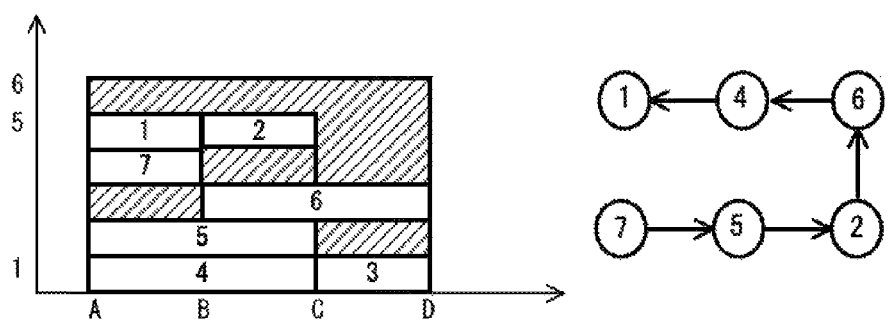

Then, the procedure information generator 17 generates procedure information representing a procedure of wavelength defrag from the current wavelength allocation illustrated in FIG. 14A to the new wavelength allocation illustrated in FIG. 14D. The procedure information is generated, for example, according to a resource dependency digraph. In this case, the procedure information can be generated by searching the resource dependency digraph from an end point to a start point. In the example illustrated in FIG. 14A and FIG. 14D, the following procedure information is generated.

Step 1: The new optical line P1 is established by using slot 5.
Step 2: The old optical line P1 is deleted (consequently, slot 1 is released between node A and node B).
Step 3: The new optical line P4 is established by using wavelength slot 1.
Step 4: The old optical line P4 is deleted (consequently, slot 3 is released).
Step 5: The new optical line P6 is established by using slot 3.
Step 6: The old optical line P6 is deleted (consequently, slot 5 is released).
Step 7: The new optical line P2 is established by using slot 5.
Step 8: The old optical line P2 is deleted (consequently, slot 2 is released).
Step 9: The new optical line P5 is established by using slot 2.
Step 10: The old optical line P5 is deleted (consequently, slot 4 is released).
Step 11: The new optical line P7 is established by using slot 4.
Step 12: The old optical line P7 is deleted (consequently, slot 6 is released).

The procedure information generated by the procedure information generator 17 is transmitted to the network control device 2. The network control device 2 performs wavelength defrag according to the received procedure information.

As described above, by employing the network design method according to the second embodiment, wavelength defrag can be realized without disconnecting any optical lines. Alternatively, the number of optical lines that are disconnected during wavelength defrag can be reduced. Accordingly, wavelength usage efficiency is improved without reducing the quality of services.

In the wavelength allocation illustrated in FIG. 14B, wavelength slots 5 and 6 are released. In contrast, in the network design method according to the second embodiment, only wavelength slot 6 is released, as illustrated in FIG. 14D. Stated another way, the wavelength usage efficiency in the network design method according to the second embodiment may be slightly inferior to that of an optimum wavelength allocation illustrated in FIG. 14B. However, the wavelength usage efficiency is improved by using the network design method according to the second embodiment in comparison with the current wavelength allocation illustrated in FIG. 14A.

FIGS. 15A-15D illustrate an example of a simulation result of wavelength defrag. A horizontal-axis direction represents a node in an optical network. A vertical-axis direction represents a wavelength (or a wavelength slot).

FIG. 15A illustrates a wavelength allocation before wavelength defrag. FIGS. 15B and 15C respectively illustrate results of wavelength defrag in the network design methods according to the first embodiment and the second embodiment. FIG. 15D illustrates a result of wavelength defrag that optimizes wavelength usage efficiency. This wavelength defrag illustrated in FIG. 15D is implemented by using integer linear programming (ILP), as described in the paper, Y. Takita et al.

When wavelength defrag is performed by using the network design method according to the first embodiment or the second embodiment, the wavelength usage efficiency of a WDM optical network is sufficiently improved. Here, wavelength usage efficiency in the wavelength defrag according to the first or second embodiment is slightly inferior to that in the optimum wavelength defrag illustrated in FIG. 15D. However, in a large-scale optical network, the time needed to determine a wavelength allocation after wavelength defrag and a wavelength changing procedure is very long in a method using integer linear programming or the like. In contrast, the time needed to determine the wavelength allocation and the wavelength changing procedure is greatly reduced in the network design method according to the first or second embodiment. Namely, a wavelength usage efficiency that is close to an optimum state can be obtained in a short processing time by using the network design method according to the first or second embodiment.

Figure 16:
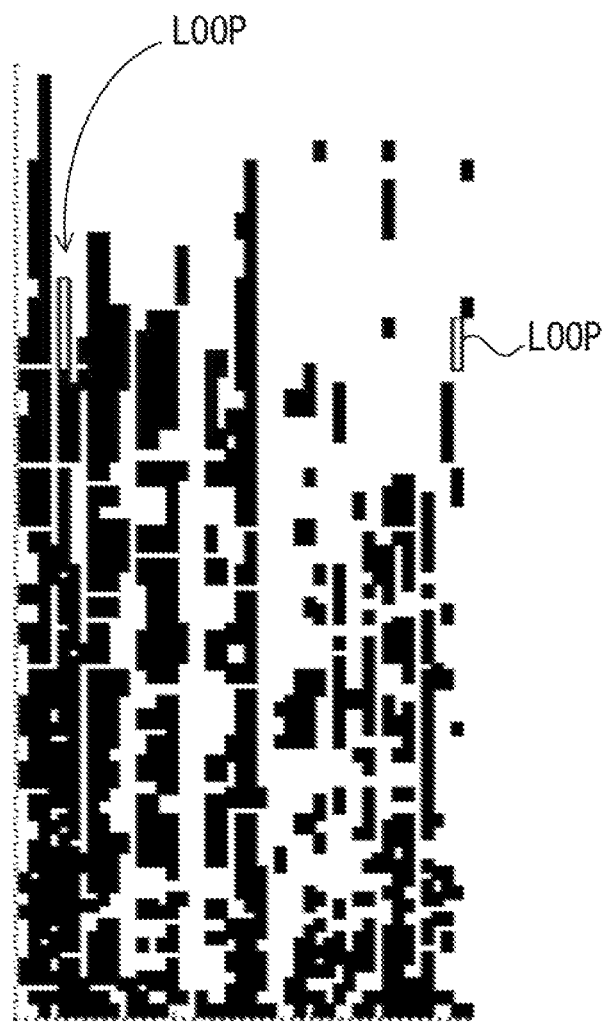
FIG. 16 illustrates a wavelength allocation after wavelength defrag according to the first embodiment.
Figure 17:
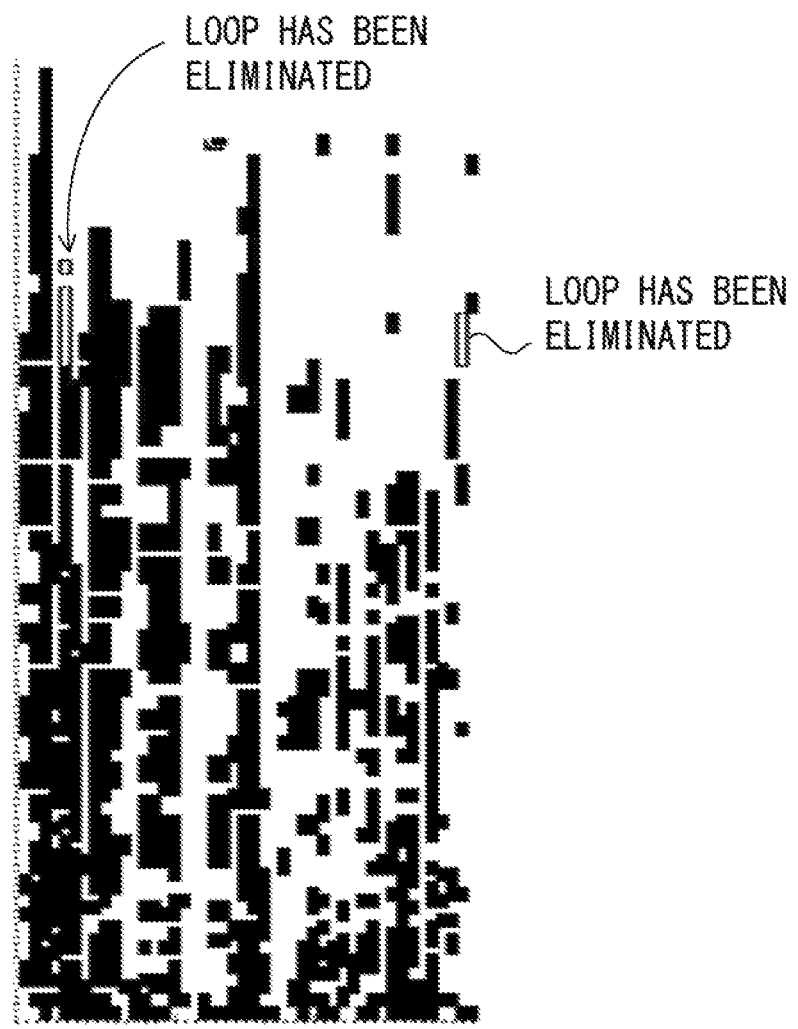
FIG. 17 illustrates a wavelength allocation after wavelength defrag according to the second embodiment.

FIG. 16 and FIG. 17 illustrate a difference between the first embodiment and the second embodiment. Note that FIG. 16 and FIG. 17 are enlarged views of FIG. 15B and FIG. 15C, respectively.

In the wavelength allocation according to the first embodiment, two loops are generated, as illustrated in FIG. 16. Optical lines that belong to the loops are illustrated by outlined rectangles. In the second embodiment, in order to eliminate these loops, wavelength allocation to at least one of the optical lines that belong to the loops is changed, as illustrated in FIG. 17. In this simulation, effects relating to improvements in the wavelength usage efficiency of the WDM optical network are substantially the same in the first embodiment and the second embodiment.

FIG. 18 illustrates effects according to the first embodiment and the second embodiment. Here, a method for determining an optimum wavelength reallocation by using integer linear programming and the first and second embodiments are compared.

Improvements in resource usage efficiency due to wavelength defrag are substantially the same in integer linear programming and the first embodiment. In contrast, improvements in the resource usage efficiency according to the second embodiment are slightly smaller than those in integer linear programming (or the first embodiment). However, a difference between integer linear programming and the second embodiment is small, as illustrated in FIGS. 15A-15D.

An impact on an optical line represents a frequency of disconnection of an optical line during wavelength defrag. In integer linear programming and the second embodiment, the number of disconnections of an optical line during wavelength defrag is zero or almost zero. In contrast, in the first embodiment, disconnection of an optical line may occur during wavelength defrag.

Scalability represents a scale of an optical network that can be processed. In integer linear programming, the time needed to determine wavelength allocation and a procedure is long, and therefore it is difficult to dynamically perform wavelength defrag in a large-scale optical network. In contrast, in the first and second embodiments, the time needed to determine the wavelength allocation and the procedure is short. Although it depends on the configuration of an optical network, the processing time according to the first and second embodiments is one tenth or less of the processing time in integer linear programming.

<Hardware Configuration>

Figure 19:
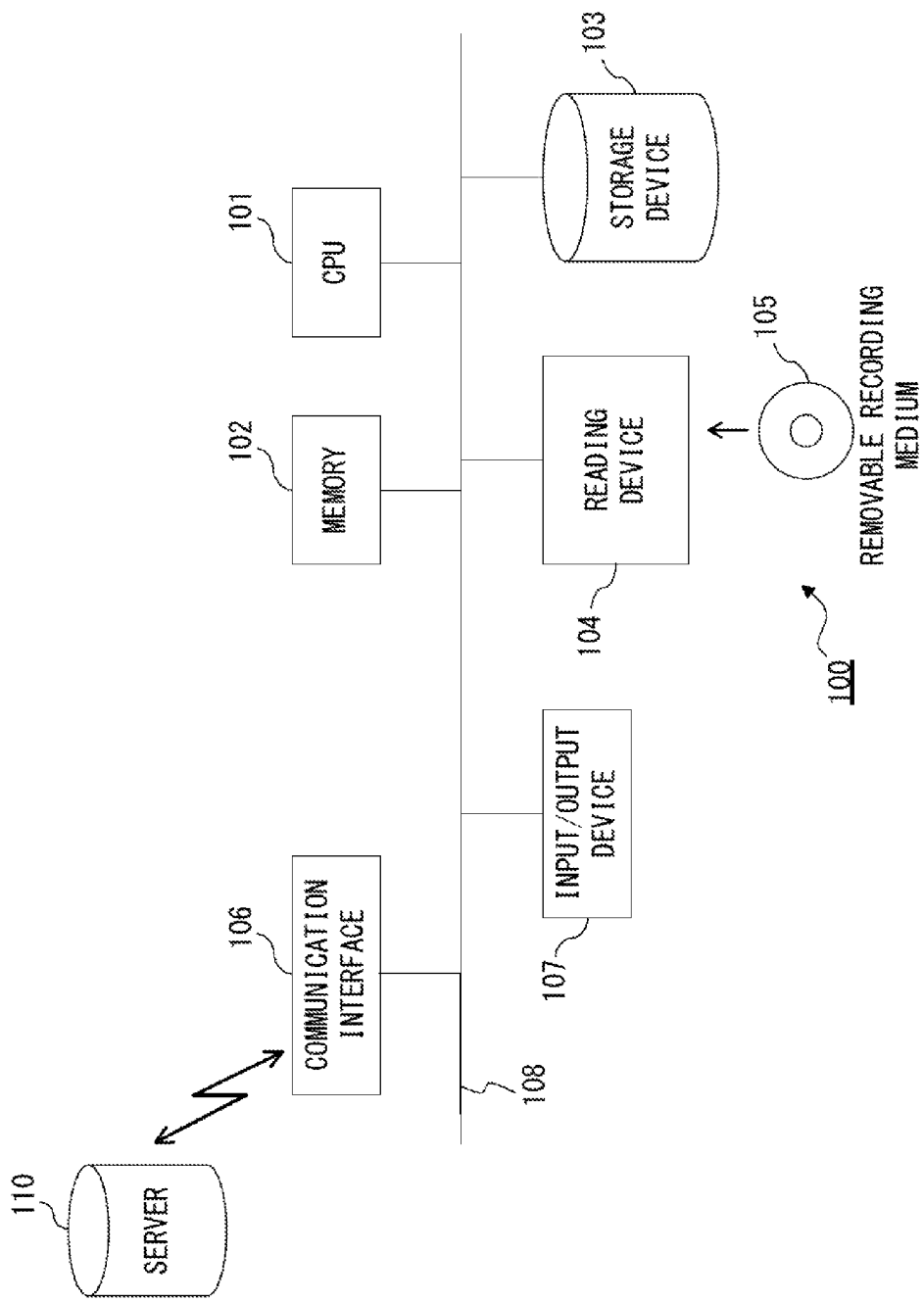
FIG. 19 illustrates an example of a hardware configuration of a network design device.

FIG. 19 illustrates an example of a hardware configuration of the network design device 1. The network design device 1 is implemented, for example, by a computer system 100 illustrated in FIG. 19. The computer system 100 includes a CPU 101, a memory 102, a storage device 103, a reading device 104, a communication interface 106, and an input/output device 107. The CPU 101, the memory 102, the storage device 103, the reading device 104, the communication interface 106, and the input/output device 107 are connected, for example, to a bus 108.

The CPU 101 executes a network design program that describes the processing of the flowchart of FIG. 9 or FIG. 12 by using the memory 102. As a result of this, the network design method above is implemented. Namely, the CPU 101 can provide functions of the wavelength reallocation unit 11, the disconnection target search unit 13, the procedure information generator 17, and the wavelength allocation adjusting unit 21.

The memory 102 is, for example, a semiconductor memory, and the memory 102 is configured so as to include a RAM area and a ROM area. A variable used in the processing of each of the flowcharts is transitorily stored in the memory 102. In addition, the loop list 15 and the disconnection target list 16 are implemented by using the memory 102. The storage device 103 is, for example, a hard disk device, and the storage device 103 stores the network design program above. In addition, the storage device 103 stores a result of the processing of each of the flowcharts. Note that the storage device 103 maybe a semiconductor memory such as a flash memory. The storage device 103 may be an external storage device.

The reading device 104 accesses a removable recording medium 105 according to an instruction of the CPU 101. The removable recording medium 105 is implemented, for example, by a semiconductor device (such as a USB memory), a medium (such as a magnetic disk) that information is input to or output from by a magnetic action, a medium (such as a CD-ROM or a DVD) that information is input to or output from by an optical action, or the like.

The communication interface 106 can transmit and receive data via a network according to an instruction of the CPU 101. Namely, the communication interface 106 can access a server 110 that exists on a network. The input/output device 107 corresponds to a keyboard, a mouse, a touch panel, or the like that is operated by a user. In addition, the input/output device 107 outputs a processing result of the CPU 101.

The network design program according to the embodiments is given to the computer system 100, for example, in the following forms.

(1) Installed in the storage device 103.
(2) Provided by the removable recording medium 105.
(3) Provided from the server 110.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network design device comprising:
    a processor configured
        to determine a second wavelength allocation based on a first wavelength allocation that indicates a wavelength allocation for a plurality of optical lines established in a wavelength division multiplexing optical network;
        to search for a disconnection target optical line that is requested to be disconnected in order to realize a transition from the first wavelength allocation to the second wavelength allocation from among the plurality of optical lines; and
        to generate procedure information that indicates a procedure of the transition from the first wavelength allocation to the second wavelength allocation based on a difference between the first wavelength allocation and the second wavelength allocation and a searched disconnection target optical line.

2. The network design device according to claim 1, wherein
    the processor determines the second wavelength allocation by changing a wavelength allocation to an optical line that satisfies a rule specified in the first wavelength allocation.

3. The network design device according to claim 1, wherein
    the processor performs:
        calculating individual used bandwidths for respective spans of the wavelength division multiplexing optical network, each of the individual used bandwidths representing a sum of bandwidths of wavelength slots allocated to corresponding optical lines in the first wavelength allocation;
        calculating a maximum bandwidth that represents a maximum value of the individual used bandwidths calculated for the respective spans; and
        changing a wavelength allocation to an optical line to which a wavelength slot that belongs to a wavelength region that exceeds the maximum bandwidth is allocated, by using, as a reference, a wavelength slot having a shortest wavelength or a wavelength slot having a longest wavelength from among a plurality of wavelength slots that can be allocated to an optical line.

4. The network design device according to claim 1, wherein the processor generates procedure information including an instruction to disconnect the disconnection target optical line.

5. The network design device according to claim 1, wherein
    the processor adjusts the second wavelength allocation by changing a wavelength that is allocated to the disconnection target optical line detected in the second wavelength allocation.

6. The network design device according to claim 5, wherein
    the processor performs a first process for extracting one disconnection target optical line from searched disconnection target optical lines, and a second process for changing a wavelength allocated to the extracted disconnection target optical line, until an optical line that is requested to be disconnected in order to realize the transition from. the first wavelength allocation to the second wavelength allocation does not exist.

7. The network design device according to claim 5, wherein the processor selects an optical line to which a longest wavelength is allocated in the second wavelength allocation from among searched disconnection target optical lines, and changes a wavelength allocated to the selected optical line.

8. The network design device according to claim 5, wherein
the processor performs:
selecting an optical line to which a longest wavelength is allocated in the second wavelength allocation from among searched disconnection target optical lines with a first priority;
selecting an optical line for which the number of spans is smaller than a specified threshold from among the searched disconnection target optical lines with a second priority;
selecting an optical line whose bandwidth is smaller than a specified threshold from among the searched disconnection target optical lines with a third priority; and
changing a wavelength allocated to the selected optical line in the second wavelength allocation.

9. A network design method that is executed by a processor, the network design method comprising:
determining a second wavelength allocation based on a first wavelength allocation that indicates a wavelength allocation for a plurality of optical lines established in a wavelength division multiplexing optical network;
searching for a disconnection target optical line that is requested to be disconnected in order to realize a transition from the first wavelength allocation to the second wavelength allocation from among the plurality of optical lines; and
generating procedure information that indicates a procedure of the transition from the first wavelength allocation to the second wavelength allocation based on a difference between the first wavelength allocation and the second wavelength allocation and a searched disconnection target optical line.

10. The network design method according to claim 9, wherein
the second wavelength allocation is adjusted by changing a wavelength allocated to the disconnection target optical line in the second wavelength allocation.

11. A non-transitory computer-readable recording medium having stored therein a program for causing a computer to execute a network design process, the process comprising:
determining a second wavelength allocation based on a first wavelength allocation that indicates a wavelength allocation for a plurality of optical lines established in a wavelength division multiplexing optical network;
searching for a disconnection target optical line that is requested to be disconnected in order to realize a transition from the first wavelength allocation to the second wavelength allocation from among the plurality of optical lines; and
generating procedure information that indicates a procedure of the transition from the first wavelength allocation to the second wavelength allocation based on a difference between the first wavelength allocation and the second wavelength allocation and a searched disconnection target optical line.

* * * * *